United States Patent [19]

Kline

[11] 3,962,187

[45] June 8, 1976

[54] STABILIZED POLYMERS OF DITERTIARY ALKYL-4-HYDROXYBENZYLOXY ALKYL ACRYLATES AND DIENES

[75] Inventor: Richard H. Kline, Cuyahoga Falls, Ohio

[73] Assignee: The Goodyear Tire & Rubber Company, Akron, Ohio

[22] Filed: July 20, 1970

[21] Appl. No.: 56,677

[52] U.S. Cl.............................. 260/62; 260/45.85 R; 260/45.95 R; 260/47 UA; 260/475 PN; 260/476 R; 260/858; 260/888; 260/485 P; 260/890; 260/897 A

[51] Int. Cl.$^2$...................... C08D 1/24; C08D 3/06; C08F 15/02

[58] Field of Search................ 260/47 U, 62, 50–71, 260/82.5 R, 87.2 R, 473, 475, 476, 485

[56] References Cited
UNITED STATES PATENTS

| | | | |
|---|---|---|---|
| 2,471,959 | 5/1949 | Hunt | 260/89.5 |
| 2,648,658 | 8/1953 | Vandenberg | 260/84.1 |
| 2,662,874 | 12/1953 | Brown | 260/79.5 C |
| 2,803,623 | 8/1957 | Anderson, Jr. | 260/83.7 |
| 2,908,665 | 10/1959 | Reynolds | 260/63 |
| 2,970,975 | 2/1961 | Maclay | 260/27 |
| 3,116,305 | 12/1963 | Morris | 260/410.5 |
| 3,380,496 | 4/1968 | Crano | 260/29.6 |
| 3,441,545 | 4/1969 | Blatz | 260/78.5 |
| 3,457,328 | 7/1969 | Blatz | 260/857 |
| 3,627,831 | 12/1971 | Huber-Emden | 260/562 P |
| 3,645,970 | 2/1972 | Kleiner | 260/47 U |

OTHER PUBLICATIONS

German Offen. 1931452, (Chem. Abst., 72, 79888p, 1970).

*Primary Examiner*—Christopher A. Henderson, Jr.
*Attorney, Agent, or Firm*—F. W. Brunner; J. A. Rozmajzl

[57] ABSTRACT

Antioxidants such as 2-(3,5-di tert.butyl-4-hydroxybenzyloxy) ethyl acrylate and 2-(3,5-di tert.butyl-4-hydroxybenzyloxy) ethyl methacrylate, age resistant polymers having age resistors physically combined therewith and age resistant polymeric compositions prepared by emulsion free radical polymerization techniques involving the use of said age resistors as monomers.

23 Claims, No Drawings

STABILIZED POLYMERS OF DITERTIARY ALKYL-4-HYDROXYBENZYLOXY ALKYL ACRYLATES AND DIENES

This invention relates to age resistors, age resistant polymeric compositions and processes for preparing said age resistors and age resistant compositions. More particularly, the invention relates to polymeric compositions that possess a high degree of resistance to the deleterious effects of oxidative aging over a prolonged period of time even after said compositions have been subjected to solvents which would extract a significant portion of many conventional age resistors when used to stabilize polymeric compositions.

Essentially all types of rubber, both natural and synthetic, and particularly rubbers formed from dienes, are known to be susceptible to deterioration resulting from prolonged exposure to oxidative aging. A great deal of effort has been expended by those engaged in the field of polymer technology to develop various stabilizers that will effectively inhibit the adverse effects of aging of polymeric compositions. Unfortunately, many of the commercially accepted stabilizers may be volatilized when the polymeric products are exposed to elevated temperatures and/or high vacuum over prolonged periods of time. Furthermore, they are rather quickly extracted from polymeric compositions by repeated washings with aqueous detergent solutions or organic solvents. These severe conditions are routinely encountered by garments containing latex treated fabric when they are subjected to frequent laundering or dry-cleaning.

It is therefore an object of this invention to provide age resistors and polymeric compositions that are resistant to oxidative aging. It is another object of this invention to provide a process for preparing age resistant polymeric compositions. A further object of this invention is to provide polymeric compositions that are highly resistant to oxidative aging at elevated temperatures even after repeated exposure to aqueous detergent solutions or dry-cleaning fluids. It is a still further object of this invention to provide polymers possessing antioxidants chemically bound thereto.

In accordance with the present invention age resistant polymeric compositions are prepared by polymerizing a phenolic age resistor with one or more comonomers. The phenolic age resistor which can be so used has the following structural formula:

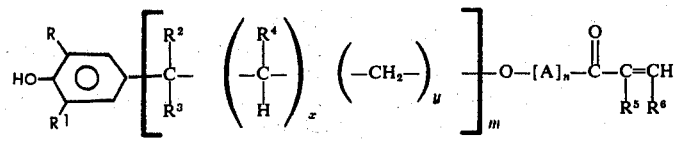

wherein R and $R^1$ are tertiary alkyl radicals having from 4 to 8 carbon atoms, wherein $R^2$ and $R^3$ are selected from the group consisting of hydrogen, alkyl radicals having from 1 to 12 carbon atoms, cycloalkyl radicals having from 5 to 12 carbon atoms, aralkyl radicals having from 7 to 13 carbon atoms and aryl radicals having from 6 to 12 carbon atoms, wherein $R^4$ is selected from the group consisting of alkyl radicals having from 1 to 12 carbon atoms, cycloalkyl radicals having from 5 to 12 carbon atoms and aralkyl radicals having from 7 to 13 carbon atoms, wherein $R^5$ is selected from the group consisting of hydrogen; alkyl radicals having from 1 to 4 carbon atoms, i.e., methyl, ethyl, propyl and butyl radicals; carboxymethyl radical and carbalkoxymethyl radicals and wherein $R^6$ is selected from the group consisting of hydrogen; alkyl radicals having from 1 to 4 carbon atoms, i.e., methyl, ethyl, propyl and butyl radicals; phenyl and substituted phenyl, e.g., a phenyl group having located in the para position, an alkyl radical having 1 to 4 carbon atoms such as methyl or an alkoxy radical having 1 or 2 carbon atoms, e.g., methoxy; carboxyl radical and carbalkoxy radicals, wherein $x$ is an integer from 0 to 4, $y$ is an integer from 0 to 11-$x$, wherein $m$ is 0 or 1, $n$ is an integer from 1 to 3, wherein A is selected from the group consisting of

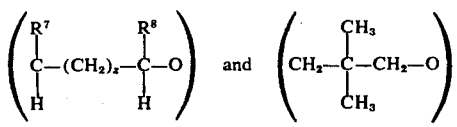

wherein $R^7$ and $R^8$ are selected from the group consisting of hydrogen, alkyl radicals having from 1 to 4 carbon atoms and aryl radicals having from 6 to 12 carbon atoms particularly substituted, e.g., with one or two alkyl or alkoxy groups and unsubstituted phenyl groups having from 6 to 12 carbon atoms and wherein $z$ is an integer from 0 to 10.

Under structural formula (I) the carbalkoxymethyl radicals preferably have the following structural formula:

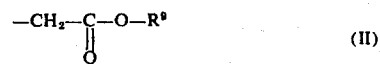

(II)

wherein $R^9$ is an alkyl radical having from 1 to 4 carbon atoms. The carbalkoxy radicals preferably have the following structural formula:

(III)

wherein $R^{10}$ is an alkyl radical having from 1 to 4 carbon atoms.

In structural formula (I), R and $R^1$ are preferably tert.butyl, tert.amyl or tert.hexyl radicals, most preferably a tert.butyl radical. Preferably $R^2$ is selected from the group consisting of hydrogen, alkyl radicals having 1 to 12 carbon atoms and substituted e.g., with one or two alkyl or alkoxy groups, and unsubstituted phenyl groups having from 6 to 12 carbon atoms. Most preferably $R^2$ is hydrogen or methyl. Preferably $R^3$ is selected from the group consisting of hydrogen, alkyl radicals having from 1 to 4 carbon atoms and substituted, e.g., with one or two alkyl or alkoxy groups, and unsubstituted phenyl groups having from 6 to 12 carbon atoms. Preferably $R^3$ is hydrogen or methyl. Preferably $R^4$ is hydrogen or methyl. Preferably $x$ is 0 or 1, $y$ is 0 to 3 and $x$ plus $y$ is 0 to 4. Even more preferred are compounds wherein $x$ is 0 and $y$ is 0 to 3. Preferably $R^5$ is hydrogen or methyl. Preferably $R^6$ is hydrogen. In structural formula (II) $R^9$ is preferably methyl or ethyl. In structural formula (III) $R^{10}$ is preferably methyl or ethyl. Preferably $R^7$ and $R^8$ are hydrogen or methyl. Most preferably both $R^7$ and $R^8$ are hydrogen or one is methyl and the other is hydrogen. Preferably $z$ is 0. Also preferred are compounds where $n$ is 1.

The radicals

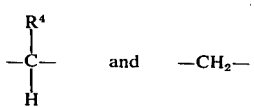

in structural formula (I) which form the linkage between the phenolic portion and the unsaturated acid portion of the molecule, can be randomly oriented in any arrangement within the linkage, i.e., they need not be arranged in any particular order.

Representative monomeric age resistors which can be used in the practice of the present invention are as follows:

2-(3,5-di tert.butyl-4-hydroxybenzyloxy) ethyl acrylate 2-(3,5-di tert.butyl-4-hydroxybenzyloxy) ethyl methacrylate 2-(3,5-di tert.butyl-4-hydroxybenzyloxy) ethyl crotonate 2-(3,5-di tert.butyl-4-hydroxybenzyloxy) ethyl cinnamate 2-(3,5-di tert.butyl-4-hydroxybenzyloxy) ethyl hydrogen maleate ethyl 2-(3,5-di tert.butyl-4-hydroxybenzyloxy) ethyl maleate 2-(3,5-di tert.butyl-4-hydroxyphenoxy) ethyl acrylate 2-(3,5-di tert.butyl-4-hydroxyphenoxy) ethyl methacrylate 1-(3,5-di tert.butyl-4-hydroxyphenyl) ethoxyethyl methacrylate 1-(3,5-di tert.butyl-4-hydroxyphenyl) propoxyethyl methacrylate phenyl-(3,5-di tert.butyl-4-hydroxyphenyl) methoxyethyl methacrylate 1-(3,5-di tert.butyl-4-hydroxyphenyl)-2-phenylethoxyethyl acrylate cyclohexyl-(3,5-di tert.butyl-4-hydroxyphenyl) methoxyethyl acrylate 2-methyl-2-(3,5-di tert.butyl-4-hydroxyphenyl) propoxyethyl methacrylate 2,2-diphenyl-2-(3,5-di tert.butyl-4-hydroxyphenyl) ethoxyethyl acrylate 3-(3,5-di tert.butyl-4-hydroxyphenyl) propoxyethyl methacrylate 2-(3,5-di tert.butyl-4-hydroxyphenyl) ethoxyethyl methacrylate 4-(3,5-di tert.butyl-4-hydroxyphenyl) butoxyethyl acrylate 6-(3,5-di tert.butyl-4-hydroxyphenyl) hexyloxyethyl methacrylate 12-(3,5-di tert.butyl-4-hydroxyphenyl) dodecyloxyethyl methacrylate 1-methyl-2-(3,5-di tert.butyl-4-hydroxyphenyl) ethoxyethyl methacrylate 2,3-dimethyl-4-(3,5-di tert.butyl-4-hydroxyphenyl) butoxyethyl acrylate 1-(3,5-di tert.butyl-4-hydroxyphenoxy)-2-propyl methacrylate 1-phenyl-2-(3,5-di tert.butyl-4-hydroxyphenoxy) ethyl methacrylate 1-methyl-2-(3,5-di tert.butyl-4-hydroxyphenoxy) propyl acrylate 1-(3,5-di tert.butyl-4-hydroxybenzyloxy)-2-propyl methacrylate 2-(3,5-di tert.butyl-4-hydroxybenzyloxy) ethoxyethyl methacrylate 2-(3,5-di tert.butyl-4-hydroxyphenoxy) ethoxyethyl methacrylate 2-(3,5-di tert.butyl-4-hydroxybenzyloxy) ethoxyethyl acrylate 2-(3,5-di tert.butyl-4-hydroxyphenoxy) ethoxyethyl acrylate 2-(3,5-di tert.butyl-4-hydroxybenzyloxy) ethoxyethoxyethyl methacrylate 2-(3,5-di tert.butyl-4-hydroxyphenoxy) ethoxyethoxyethyl methacrylate 2-(3,5-di tert.amyl-4-hydroxybenzyloxy) ethyl methacrylate 2-(3,5-di tert.amyl-4-hydroxybenzyloxy) ethyl acrylate 2-(3,5-di tert.amyl-4-hydroxyphenoxy) ethyl methacrylate 2-(3,5-di tert.amyl-4-hydroxyphenoxy) ethyl acrylate 2-[3,5-bis(1,1-dimethylbutyl)-4-hydroxybenzyloxy] ethyl methacrylate 2-[3,5-bis(1,1-dimethylbutyl)-4-hydroxybenzyloxy] ethyl acrylate 2-[3,5-bis(1,1-dimethylbutyl)-4-hydroxyphenoxy] ethyl methacrylate 2-[3,5-bis(1,1,2-trimethylpropyl)-4-hydroxybenzyloxy] ethyl methacrylate 2-[3,5-bis(1,1,2-trimethylpropyl)-4-hydroxyphenoxy] ethyl methacrylate 2-[3,5-bis(1,1-dimethylpentyl)-4-hydroxybenzyloxy] ethyl methacrylate 2-[3,5-bis(1,1-dimethylpentyl)-4-hydroxyphenoxy] ethyl methacrylate 2-[3,5-bis(1,1,3-trimethylbutyl)-4-hydroxybenzyloxy] ethyl methacrylate 2-[3,5-bis(1,1,3-trimethylbutyl)-4-hydroxyphenoxy] ethyl methacrylate 2-[3,5-bis(1,1,3,3-tetramethylbutyl)-4-hydroxybenzyloxy] ethyl methacrylate 2-[3,5-bis(1,1,3,3-tetramethylbutyl)-4-hydroxyphenoxy] ethyl acrylate 2-[3,5-bis(1,1,3,3-tetramethylbutyl)-4-hydroxyphenoxy] ethyl methacrylate The compounds of this invention may be prepared by reacting an acid halide of an α-β-unsaturated carboxylic acid such as acryloyl chloride or methacryloyl chloride with a 3,5-di tert.alkyl-4-hydroxyphenyl substituted hydroxyether or hydroxypolyether such as 2-(3,5-di tert.butyl-4-hydroxyphenoxy) ethanol, 2-(3,5-di tert.butyl-4-hydroxybenzyloxy) ethanol, or 2-(3,5-di tert.butyl-4-hydroxyphenoxy) ethoxyethanol in the presence of an organic base such as triethylamine or pyridine. The temperature at which the reaction is carried out may vary from about room temperature to about 60°C. and the time required for the reaction to take place may vary from about 15 minutes to about 6 hours. The reaction is normally carried out in a solvent which is inert toward acid halides such as diethyl ether, tetrahydrofuran, or hexano. The organic base, if used in sufficient excess, may also serve as the solvent. Whether the monomeric age resistors are prepared by the above methods or any other method is not critical to the practice of the present invention.

The aforementioned monomeric age resistors may be polymerized by well known free radical emulsion polymerization techniques with one or more comonomers that are known to polymerize in free radical initiated polymerization systems. Some adjustments in the polymerization recipe and/or conditions may be necessary to obtain a satisfactory rate of polymer formation, depending on the amount of monomeric age resistor included and the other monomers involved. Adjustments which may be necessary in the polymerization conditions to improve polymerization rates include increasing the temperature of polymerization and/or increasing the initiator level and/or increasing the level of activator ingredients. Solvents may also be required to obtain adequate solubility of the monomers with each other as well as to solubilize other ingredients where required. Some solvents, such as methyl ethyl ketone or isopropyl alcohol, can be used to advantage with the emulsion polymerization system. These adjustments, where necessary, are to counteract the inhibitory effect of the monomeric age resistor and to insure its solubility in the system.

Examples of free radical initiators that are useful in the practice of this invention are those known as "Redox" initiators, such as appropriate combinations of chelated iron salts, sodium formaldehyde sulfoxylate and organic hydroperoxides such as cumene and paramenthane hydroperoxides. Other initiators such as azoisobutyronitrile, benzoyl peroxide, hydrogen peroxide and potassium persulfate may also be used, depending on the particular polymerization recipe.

The monomeric age resistors used in the practice of this invention have certain chemical characteristics which preclude their use in polymerization processes other than those initiated by free radicals. By "free radical initiated systems" is meant systems wherein free radicals are generated by any of various processes such as thermal decomposition of various persulfate, perborate, peroxide, azo or azonitrile compounds; induced (catalytic or "Redox" promoted) decomposition of various persulfate, peroxide or hydroperoxide compounds and generation of free radicals by exposure of the system to high energy radiation such as radiation from a radioactive source or ultraviolet light. Such systems are very well known in the art and are widely used commercially, e.g., in the preparation of SBR, styrene/butadiene copolymers.

The most widely used system for preparation of elastomeric polymers, i.e., polymers prepared from a monomer charge made up of at least 40 weight percent diene, preferably at least 60 weight percent diene, by free radical initiation is the emulsion system. Polymers ranging all the way from liquid, low molecular weight (number average molecular weights of about 2,000 to 10,000) to polymers of intermediate molecular weight (60,000 to 70,000 and higher) to oil extendable, at least 50 percent soluble, rubbery solid, high molecular weight (100,000 to 500,000 or more) and even highly gelled, less than 50 percent soluble, may be prepared by emulsion polymerization. The monomeric age resistors of the present invention can be used in such emulsion polymerization systems to produce polymers of the aforementioned type.

The principles of emulsion polymerization are discussed in references such as "Synthetic Rubber" by G. S. Whitby, Editor-in-Chief, John Wiley and Sons, 1954, particularly Chapter 8, and "Emulsion Polymerization" by F. A. Boxey et al, Vol. IX of "High Polymers", Interscience Publishers Inc. 1955. Some specialized applications of these principles are indicated in U.S. Pat. Nos. such as 3,080,334; 3,222,334; 3,223,663; 3,468,833 and 3,099,650.

Some apparently have assumed that antioxidants such as sterically hindered phenols would react rapidly with free radicals of the type useful for initiating polymerization. Various techniques have been developed to obtain the desired end products by round about routes. U.S. Pat. No. 3,457,328 teaches the preparation of polymeric acid chlorides from carboxylated polymers, which, in turn, are reacted with various chemicals possessing chemical functions, including hindered phenols, which contribute desirable properties to the polymers to which they are attached. G. Manerke et al [Makromolekulare Chemie 99 175–185 (1966)] prepared polymers using phenolic derivatives where the phenolic group was blocked by esterification or some other appropriate reaction; then, after the polymerization step was completed, the free phenolic group was regenerated by a chemical process such as hydrolysis. The invention described herein provides a much simpler and straight forward system for building antioxidant groups into polymers.

Very effective as free radical polymerization initiators used within the practice of the present invention, when used under appropriate conditions, are compounds such as t-butyl hydroperoxide and paramenthane hydroperoxide, and even hydrogen peroxide. These compounds perform very effectively when used in polymerization recipes containing appropriate levels of supporting ingredients. By "supporting ingredients" is meant those materials often referred to as activators in emulsion, or other systems, where required. U.S. Pat. No. 3,080,334 describes some of these materials at column 5, lines 20–26. Such materials can also be referred to as catalyst activators. The term "Redox Polymerization" is often used where the complete initiation system includes a Redox system, i.e., reducing agents and oxidizing agents in a proportion that yields polymerization initiating species. All of these initiator systems are well known in the art.

Emulsion polymerizations are normally accomplished in the range of 5° C. to 90° C. Though the activated or Redox initiated systems are preferred for low temperature polymerizations, they are very effective at high temperatures also, normally requiring appreciably lower quantities of various ingredients to obtain a desirable polymerization rate.

The free radical sources used in the initiator systems are those customarily used in free radical polymerizations, for example, organic initiators such as azonitriles, azo-derivatives, peroxides, and hydroperoxides and inorganic initiators such as inorganic peroxy compounds. Radiation, e.g., of the ultra-violet and gamma ray type can also be used as a free radical source. Various organic initiators are described by J. Brandrup and E. H. Immergut, Polymer Handbook (John Wiley & Sons), 1965, pages II-3 to II-51. Peroxide initiators include the aralkyl, aliphatic, aliphatic acyl, aromatic acyl, ketone, aldehyde and perester types. Hydroperoxide compounds include aralkyl and aliphatic hydroperoxides. Inorganic peroxy compounds include persulfates, perborates, perphosphates and hydrogen peroxide.

Aralkyl peroxides are represented by dicumyl peroxide; aliphatic peroxides by di tert.butyl peroxide; aliphatic acyl peroxides by acetyl peroxide, decanoyl peroxide and lauroyl peroxide; aromatic acyl peroxides by benzoyl peroxide and 2,4-dichlorobenzoyl peroxide; ketone peroxides by methylethyl ketone peroxide and cyclohexanone peroxide; aldehyde peroxides by heptaldehyde peroxide; and perester peroxides by tert.butyl peracetate, tert.butyl perpivalate and tert.butyl perbenzoate. Aralkyl hydroperoxides are represented by cumene hydroperoxide and diisopropylbenzene hydroperoxide and aliphatic hydroperoxides by tert.butyl hydroperoxide and paramenthane hydroperoxide. Persulfate, perborate and perphosphate compounds are represented by the sodium, potassium and ammonium persulfates, perborates and perphosphates; azo-nitriles and azo-derivatives by 2,2'-azo-bis-isobutyronitrile, 2,2'-azo-bis-2-methylpropionitrile and azo-bis-diphenylmethane.

Supporting ingredients, i.e., activators capable of activating certain initiators to produce free radicals include iron compounds such as ferrous sulfate or cobalt compounds, complexed with compounds such as sodium salts of ethylene diamine tetra acetic acid or sodium or potassium pyrophosphate. Reducing agents used in Redox systems include sodium formaldehyde sulfoxylate, various sugars and hydrosulfites.

Various initiator system components are described at column 4, lines 14 to 32, in U.S. Pat. No. 3,080,334.

Examples of comonomers that are useful in the practice of this invention are polymerizable unsaturated hydrocarbons, both substituted and unsubstituted, including conjugated diene monomers, such as butadiene-1,3; 2-chlorobutadiene-1,3; isoprene; 2-ethyl-butadiene-1,3; 2,3-dimethyl butadiene-1,3; piperylene; and hexadienes and copolymerizable monoolefins including vinyl and vinylidene monomers such as styrene, α-methylstyrene, divinyl benzene, vinyl chloride, vinyl acetate, vinylidene chloride, methylmethacrylate, ethylacrylate, the vinylpyridines including 2-vinyl pyridine, 5-methyl-2-vinyl pyridine, 4-vinyl pyridine and 2-vinyl-5-ethyl pyridine, acrylonitrile, methacrylonitrile, methacrylic acid and acrylic acid. Mixtures of the monomeric age resistors and mixtures of the comonomers may be used. The monomer charge weight ratio is normally from about 0.10/99.9 to about 10/90 or even 20/80 monomeric age resistor/comonomer. The ratio may even be as high as 30/70 or 60/40. A charge ratio of about 0.5/99.5 to about 5.0/95 is preferred. Ratios will vary depending on the amount of age resistor desired to be bound and on the reactivity ratios of the monomers in the particular polymerization system used. In all cases the monomer system will always contain at least 40 parts by weight of a diene monomer.

Preferably the monomer system contains at least 50 parts by weight per 100 parts by weight of total monomer of at least one diene, preferably a conjugated diene, such as 1,3-butadiene or isoprene.

One embodiment of the present invention involves the use of a monomer system comprised of from about 50 to about 99.9 parts of at least one diene monomer, preferably a conjugated diene, 0 to about 49.9 parts of at least one monomer selected from the group consisting of vinyl monomers and vinylidene monomers and from about 0.10 to about 5.0 parts by weight of at least one monomeric age resistor, all parts being parts by weight per 100 parts by weight of total monomer. Preferably at least 0.5 part of monomeric age resistor is used. When at least 0.5 part of the monomeric age resistor is used, the upper limit of the vinyl monomer and/or vinylidene monomer range is 49.5 parts. The upper limit of the monomeric age resistor range may be even higher than 5.0, i.e., 10, 20, 30 and even 50.

The polymers resulting from the free radical polymerizations of monomeric systems containing the monomeric age resistors of the present invention contain at least one segmeric unit having the following structure.

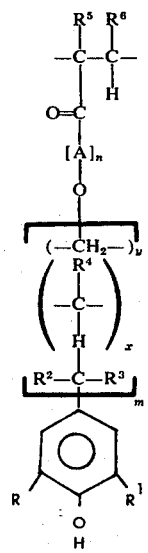

These polymers, whether liquid or solid, have a special advantage in that the age resistant portion is not extractable, and therefore the polymeric compositions are highly resistant to oxidative aging even after repeated exposure to aqueous detergent solutions or dry-cleaning fluids. This feature is especially significant where polymers are used in foam backings for rugs and where polymers are used in solution or latex form to treat fabrics, since such products are often exposed to aqueous detergent solutions or dry-cleaning fluids. This feature is also significant where factors such as contact with lubricating oils or exposure to high vacuum conditions are a consideration.

One of the advantages of the present process is that it permits the preparation of polymers prepared from monomer systems containing diene monomers and containing built-in stabilizers, without the formation of appreciable gel, that is, polymers can be made which are essentially gel-free. Gel formation is generally undesirable in a polymer since it can cause processing difficulties and directly and/or indirectly can affect the physical properties of the polymer in its vulcanized form. Normally a macro gel content of less than 50 percent is desirable. Preferably a gel content of less than 10 percent is desirable. Most preferably a gel content below 5 percent is desirable. Gel is the amount of polymer that is insoluble in an organic solvent such as benzene. One way to measure gel content comprises placing about 0.20 to about 0.30 grams of the polymer in 100 milliliters of benzene and permitting the mixture to stand for 48 hours. The mixture is then filtered through a 100 mesh stainless steel wire cloth having a wire diameter of 0.045 inch. A solids is then run on the filtrate to determine the amount of soluble polymer. The amount of gel is the difference between the amount of polymer placed in the benzene originally and the amount of soluble polymer. The percent gel is one hundred times the gel weight divided by the original polymer weight.

To afford adequate protection against degradation the polymers should contain from about 0.10 part to about 10.0 parts by weight of the segmeric form of the monomeric age resistor per 100 parts by weight of the polymer, although from about 0.50 part to about 5.0 parts is normally satisfactory, from about 0.50 part to about 3.0 parts being preferred. As much as 20 parts, 30 parts, 50 parts and more of the polymer may consist of the age resistor segmeric unit while the lower limit may be 0.50 to 0.10 part and lower. However, as the amount of bound age resistor increases the physical characteristics of the polymer are altered accordingly. Where it is desired to produce a polymer which is self-stabilizing and which substantially retains the physical properties of the comonomer or comonomers, normally the polymer should contain no more than about 10.0 parts by weight of the age resistor segmeric unit. Such polymers preferably are elastomeric solids, although they may be liquid. Where it is desired that the polymer act as a polymeric age resistor which may be blended with unstabilized polymers the polymer should normally contain greater amounts of the monomeric age resistor. The remainder of the polymer is comprised preferably of the segmeric form of at least one conjugated diene monomer and/or the segmeric form of at least one vinyl monomer. Preferably the polymers contain at least 50 percent by weight of the segmeric form of a diene, preferably a conjugated diene such as butadiene-1,3 or isoprene. Most preferred are polymers containing from about 50 to about 99.9 parts by weight of the segmeric form of at least one diene, preferably a conjugated diene, 0 to about 49.9 parts by weight of the segmeric form of at least one monomer selected from the group consisting of vinyl monomers and vinylidene monomers and 0.10 to 5.0 parts by weight of the segmeric form of at least one monomeric age resistor, all parts being by weight per 100 parts by weight of polymer. Preferably the polymer contains at least 0.5 part of the segmeric form of the monomeric age resistor. When the polymer contains at least 0.5 part of the segmeric form of the monomeric age resistor, the upper limit of diene segmer range is 99,5 parts and the upper limit of the vinyl segmer and/or vinylidene segmer range is 49.5 parts. The upper limit of the segmeric form of the monomeric age resistor range may be even higher than 5.0, i.e., 10, 20, 30 and even 50. In all instances the polymers must contain at least 40 parts by weight of the segmeric form of a diene monomer, preferably a conjugated diene. In polymers generally prepared by free radical emulsion techniques, the trans 1,4 content is generally greater than the cis-1,4 or 1,2 content.

All of the phenolic compounds described herein are capable of stabilizing polymers by simple incorporation into the polymers by conventional techniques such as by addition to polymer latices or by addition to the solid polymer on a mill or in a Banbury. When blending a self-stabilizing polymer with other polymers, especially when the self-stabilizing polymer contains large amounts of the segmeric form of the monomeric age resistor, one must consider the solubility problems involved in blending dissimilar polymers.

Polymers subject to deterioration by oxidation that can be conveniently protected by the age resistors described herein include substituted and unsubstituted, saturated and unsaturated, natural and synthetic polymers. The oxidizable natural polymers include natural rubber in its various forms, e.g., pale crepe and smoked sheet, and balata and gutta percha. The oxidizable synthetic polymers are prepared from a single monomer (homopolymer) or a mixture of two or more copolymerizable monomers (copolymers) wherein the monomers are combined in a random distribution or block form. The monomers may be substituted or unsubstituted and may process one or more double bonds, for example, diene monomers, both conjugated and nonconjugated, and monoolefins including cyclic and acyclic monoolefins, especially vinyl and vinylidene monomers. Examples of conjugated dienes are 1,3-butadiene, isoprene, chloroprene, 2-ethyl-1,3-butadiene, 2,3-dimethyl-1,3-butadidene and piperylene. Examples of nonconjugated dienes are 1,4-pentadiene, 1,4-hexadiene, 1,5-hexadiene, dicyclopentadiene, 1,5-cyclooctadiene and ethylidene norbornene. Examples of acyclic monoolefins are ethylene, propylene, 1-butene, isobutylene, 1-pentene and 1-hexene. Examples of cyclic monoolefins are cyclopentene, cyclohexene, cycloheptene, cyclooctene and 4-methyl-cyclooctene. Examples of vinyl monomers are styrene, acrylonitrile, acrylic acid, ethylacrylate, butylacrylate, methyl vinyl ether, vinyl acetate and vinyl pyridine. Examples of vinylidene monomers are $\alpha$-methylstyrene, methacrylic acid, methyl methacrylate, ethyl methacrylate, glycidyl methacrylate and vinylidene chloride. Representative examples of the synthetic polymers used in the practice of this invention are polychloroprene; homopolymers of a conjugated 1,3-diene such as isoprene and butadiene, and in particular, polyisoprene and polybutadienes having essentially all of their repeat units combined in a cis-1,4 structure; copolymers of a conjugated 1,3-diene such as isoprene and butadiene with up to 50 percent by weight of at least one copolymerizable monomer including ethylenically unsaturated monomers such as styrene or acrylonitrile; butyl rubber, which is a polymerization product of a major proportion of a monoolefin and a minor proportion of a multiolefin such as butadiene or isoprene; polyurethanes containing carbon to carbon double bonds; and polymers and copolymers of monoolefins containing little or no unsaturation, such as polyethylene, polypropylene, ethylene propylene copolymers and terpolymers of ethylene, propylene and a nonconjugated diene such as dicyclopentadiene, 1,4-hexadiene, ethylidene norbornene and methylene norbornene.

When added in free form normally 0.001 to 10.0 percent of the age resistor by weight, i.e., parts by weight based on the weight of the polymer, i.e., 100 parts by weight of the polymer can be used, although the precise amount of the age resistors which is to be employed will depend somewhat on the nature of the polymer and the severity of the deteriorating conditions to which the polymer is to be exposed. In unsaturated polymers such as those made from conjugated dienes, the amount of age resistor necessary is greater than that required by a saturated polymer such as polyethylene. It has been found that an effective antioxidant amount of the disclosed stabilizers in rubbery unsaturated polymers will generally range from 0.05 to 5.0 percent by weight, i.e., parts by weight based on the weight of the polymer, although it is commonly preferred to use from 0.5 to 3.0 percent by weight, i.e., parts by weight based on the weight of the polymer. Mixtures of the age resistors may be used.

The following examples illustrate the practice of the present invention. Unless otherwise indicated, all parts are parts by weight.

Examples 1 to 3 illustrate the preparation of age resistors which can be used to stabilize polymers by physically combining the polymers therewith or which can be used in free radical emulsion polymerization systems as monomers to produce self-stabilizing polymers.

EXAMPLE 1

2-(3,5-di tert.butyl-4-hydroxybenzyloxy) ethyl acrylate was prepared by adding dropwise a solution of 5 grams of acryloyl chloride in 25 milliliters of tetrahydrofuran to a solution of 14 grams of 2-(3,5-di tert.butyl-4-hydroxybenzyloxy) ethanol and 20.2 grams of triethylamine in 80 milliliters of tetrahydrofuran. The addition was completed in 20 minutes and the reaction mixture was stirred at room temperature for 5½ hours. The reaction mixture was then poured into 300 milliliters of water and the oil which precipitated was separated by extraction with petroleum ether. Cooling the petroleum ether solution in a dry ice-acetone bath and filtering off the crystalline precipitate yielded 3.5 grams of product with melting point of 58° C to 61° C. The filtrate was allowed to evaporate and the solid residue, after washing with a 10 percent hydrochloric acid solution and then with cold petroleum ether, yielded an additional 7.2 grams of product which melted at 58° C. to 62° C.

EXAMPLE 2

2-(3,5-di tert.butyl-4-hydroxybenzyloxy) ethyl methacrylate was prepared by adding dropwise a solution of 3.1 grams of methacryloyl chloride in 15 milliliters of tetrahydrofuran to a solution of 7.6 grams of 2-(3,5-di tert.butyl-4-hydroxybenzyloxy) ethanol and 11 grams of triethylamine in 50 milliliters of tetrahydrofuran. The addition was completed in 5 minutes and the reaction mixture was stirred at room temperature for 6 hours. The reaction mixture was then poured into a solution of 20 milliliters of concentrated hydrochloric acid in 400 milliliters of water and the oil which precipitated was separated by extraction with petroleum ether. The extract was allowed to evaporate to a syrupy residue which crystallized on stirring. The crystalline mass was washed with petroleum ether yielding 7.0 grams of crude product, which after two recrytallizations from hexane, melted at 70° C. to 72° C.

EXAMPLE 3

2-(3,5-ditert.butyl-4-hydroxyphenoxy)ethyl methacrylate was prepared by adding dropwise a solution of 3.1 grams of methacryloyl chloride in 15 milliliters of tetrahydrofuran to a solution of 7 grams of 2-(3,5-ditert.butyl-4-hydroxyphenoxy)ethanol and 11 grams of triethylamine in 50 milliliters of tetrahydrofuran. The addition was completed in 5 minutes and the reaction mixture was stirred at room temperature for 4 hours. The reaction mixture was then poured into a solution of 20 milliliters of concentrated hydrochloric acid in 400 milliliters of water and the oil which precipitated was separated by extraction with petroleum ether. The extract was allowed to evaporate and the solid residue was recrystallized from petroleum ether to yield 4 grams of product which melted at 68° C. to 70° C.

The following examples illustrate the preparation of polymers containing monomeric age resistors as part of the polymeric chain. They also illustrate the age resistance possessed by said polymers and also by polymers having the monomeric age resistors physically combined therewith. Unless otherwise indicated all parts are parts by weight.

EXAMPLE 4

The following polymerization recipe was used to prepare a butadiene/styrene/2-(3,5-ditert.butyl-4-hydroxybenzyloxy) ethyl acrylate copolymer. The polymerization was run in an 8 ounce bottle.

| Order of Addition | Ingredients | Parts |
|---|---|---|
| 1 | 2-(3,5-di tert.butyl-4-hydroxybenzyloxy) ethyl acrylate | 1.25 |
| 2 | Styrene | 25.0 |
|   | Tertiary dodecyl mercaptan | 0.33 |
| 3 | Water | 190 |
|   | Potassium soap of disproportioned rosin acids | 2.26 |
|   | Sodium soap of tallow fatty acids | 2.45 |
|   | Trisodium phosphate | 0.25 |
|   | Sodium salt of condensed naphthalene sulfonic acid | 0.08 |
|   | $Na_2S_2O_4$ | 0.0016 |
| 4 | Butadiene | 75.0 |
| 5 | Water | 10.0 |
|   | Chelating Agent* | 0.7 |
|   | Sodium formaldehyde sulfoxylate | 0.125 |
|   | $FeSo_4.7 H_2O$ | 0.0075 |
|   | $Na_2S_2O_4$ | 0.02 |
| 6 | Paramenthane hydroperoxide | 0.1 |
|   | Methanol | 2.0 |

*90/10 mixture of tetrasodium salt of ethylene diamine tetraacetic acid and mono-sodium salt of N,N-di(α-hydroxyethyl)glycine. Unless indicated otherwise herein, this is the chelating agent that was used in all of the polymerizations.

The ingredients were added in the combinations and order indicated above. The polymerization was run for 5½ hours at 50° C. to a conversion of 81 percent.

EXAMPLE 5

The polymerization described in Example 4 was repeated substituting 2-(3,5-di tert.butyl-4-hydroxyphenoxy) ethyl methacrylate for the acrylate. The polymerization was shortstopped at 82 percent conversion after 5½ hours. As in Example 4, the polymer was methanol coagulated and dried.

Table I contains oxygen absorption data for polymers of the present invention prepared by emulsion polymerization techniques from monomer systems containing monomeric age resistors of the present invention. The polymerizations were similar if not identical to those described in Examples 4 and 5. Table II contains oxygen absorption data for SBR-1006 (butadiene/styrene elastomer) containing monomeric age resistors physically incorporated therein.

Before oxygen absorption tests were run on the polymers described in Table I, the dry polymers were extracted for 48 hours with methanol in a Soxhlet type apparatus to remove any of the free monomeric age resistor, dried again, and then dissolved in benzene. The benzene solutions were poured into aluminum trays and the solvent was allowed to evaporate. The resulting films were placed in an oxygen absorption apparatus. The amount of oxygen absorbed in a particular interval of time was determined and is listed in the following Table I. The testing procedure is described in further detail in INDUSTRIAL AND ENGINEERING CHEMISTRY, Vol. 43, page 456 (1951) and INDUSTRIAL AND ENGINEERING CHEMISTRY, Vol. 45, page 392 (1953).

The SBR polymer (1006) in Table II was dissolved in benzene and benzene solutions of the age resistors were added to portions of the SBR solutions to provide 1.00 part of the age resistors per 100 parts of rubbery polymer. The benzene solutions were used to form films and tested in oxygen absorption apparatus as described above.

The above data demonstrate that the monomeric age resistors described herein are capable of providing age resistant polymeric compositions by either polymerizing the monomeric age resistor in an emulsion free radical polymerization system along with comonomers or by incorporating the monomeric age resistors by conventional techniques into the polymers. That is, the age resistors provide protection whether in a free or bound condition. Any of the monomeric age resistors, comonomers, initiator systems or polymers described earlier herein can be substituted for their counterparts in the above working examples to provide age resistant polymeric compositions. Naturally certain changes in variables such as the emulsification system to be used may be necessary as a result of the use of different monomers. However, such changes would be routine to those skilled in the art.

For example, in Examples 4 and 5, isoprene could have been substituted for the butadiene. Likewise vinylidene chloride, 2-vinyl pyridine or acrylonitrile could have been substituted for the styrene or acrylonitrile used in said examples. Also, for example, 2-(3,5-di tert.butyl-4-hydroxybenzyloxy) ethyl crotonate or ethyl cinnamate could have been substituted for the ethyl acrylate in Example 4 or the ethyl methacrylate in Example 5. Also for example, tert.butyl hydroperoxide could have been substituted for para-menthane hyroperoxide in Example 4 at a level of, for example 0.03 to 0.04 part.

The polymers prepared in Examples 4 and 5 were solid elastomers.

Naturally polymerization rates and amounts of bound monomer can vary, as well as the type of emulsifier to be used depending upon the monomers used. Also, reactor size and degree of agitation can affect polymerization rates. However, optimum conditions and systems can be determined based upon the above revelations by routine experimentation by one possessing ordinary skill in the art.

All polymer molecular weights referred to herein, unless otherwise indicated, are number average molecular weights.

Table I

| Monomer System (Parts) | | Hours to 1% Oxygen Absorbed at 100° C. |
|---|---|---|
| Monomeric Age Resistor | Comonomers | |
| 2-(3,5-di tert.butyl-4-hydroxybenzyloxy) ethyl acrylate (1.25 parts) | (75/25) butadiene/ styrene | 154 |
| 2-(3,5-di tert.butyl-4-hydroxyphenoxy) ethyl methacrylate (1.25 parts) | (75/25) butadiene/ styrene | 246 |
| 2-(3,5-di tert.butyl-4-hydroxybenzyloxy) ethyl methacrylate (1.25 parts) | (75/25) butadiene/ styrene | 193 |
| 2-(3,5-di tert.butyl-4-hydroxybenzyloxy) ethyl acrylate (1.25 parts) | (67/33) butadiene/ acrylonitrile | 189 |

Table II

SBR-1006

| Antioxidant | Hours to 1% Oxygen Absorbed at 100° C. |
|---|---|
| 2-(3,5-di tert.butyl-4-hydroxybenzyloxy) ethyl acrylate (1.0 part) | 292 |
| 2-(3,5-di tert.butyl-4-hydroxyphenoxy) ethyl methacrylate (1.0 part) | 399 |

The age resistant polymeric compositions prepared by chemically binding the age resistors or by physically incorporating them into polymers, are age resistant, whether in vulcanized or unvulcanized form. They may be used, depending on the particular polymer involved, in products such as tires, industrial rubber products, such as transmission belts and hose, and molded goods. Where the polymeric composition contains the age resistor as an integral part of the polymer chain it is especially useful in applications where a product is frequently exposed to aqueous detergent solutions or dry-cleaning fluids, for example, in foam backings for rugs and in polymer treated fabrics.

Polymerization rates can often be improved by using a purified monomeric age resistor and/or by raising the polymerization temperatures, using more potent initiator systems, increasing the initiator level or by any of the conventional means of improving polymerization rates.

While certain representative embodiments and details have been shown for the purpose of illustrating the invention, it will be apparent to those skilled in this art that various changes and modifications may be made therein without departing from the spirit or scope of the invention.

What is claimed is:

1. A process of preparing an age resistant polymeric composition comprising polymerizing in an emulsion free radical polymerization system, a monomer system containing at least one phenolic monomer having the following structural formula:

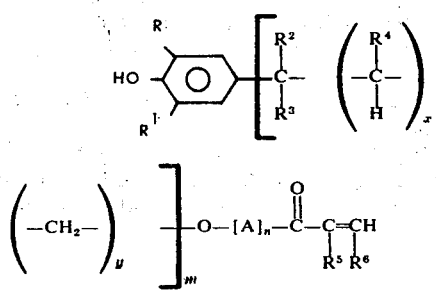

wherein R and $R^1$ are tertiary alkyl radicals having from 4 to 8 carbon atoms, wherein $R^2$ and $R^3$ are selected from the group consisting of hydrogen, alkyl radicals having from 1 to 12 carbon atoms, cycloalkyl radicals having from 5 to 12 carbon atoms, aralkyl radicals having from 7 to 13 carbon atoms and aryl radicals having from 6 to 12 carbon atoms, wherein $R^4$ is selected from the group consisting of alkyl radicals having from 1 to 12 carbon atoms, cycloalkyl radicals having from 5 to 12 carbon atoms and aralkyl radicals having from 7 to 13 carbon atoms, wherein $R^5$ is selected from the group consisting of hydrogen; alkyl radicals having from 1 to 4 carbon atoms, carboxymethyl radical and carbalkoxymethyl radicals and wherein $R^6$ is selected from the group consisting of hydrogen, alkyl radicals having from 1 to 4 carbon atoms, phenyl and substituted phenyl radicals having located in the para position a radical selected from the group consisting of alkyl radicals having 1 to 4 carbon atoms and alkoxy radicals having 1 or 2 carbon atoms, carboxyl radical and carbalkoxy radicals, wherein $x$ is an integer from 0 to 4, $y$ is an integer from 0 to 11-$x$, wherein $m$ is 0 or 1, $n$ is an integer from 1 to 3, wherein A is selected from the group consisting of

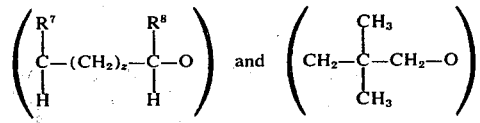

wherein $R^7$ and $R^8$ are selected from the group consisting of hydrogen, alkyl radicals having from 1 to 4 carbon atoms and aryl radicals having from 6 to 12 carbon atoms, wherein $z$ is an integer from 0 to 10, and wherein the monomer system contains at least 40 parts by weight of diene monomer per 100 parts by weight of total monomer in the monomer system.

2. The process according to claim 1 wherein the diene monomer is a conjugated diene monomer.

3. The process according to claim 2 wherein the diene monomer is a conjugated 1,3-diene monomer.

4. The process according to claim 3 wherein the monomer system contains 0.10 to 10.0 parts by weight of at least one phenolic monomer per 100 parts by weight of total monomer.

5. The process according to claim 1 wherein the monomer system is comprised of from 50 to 99.9 parts of at least one conjugated diene monomer, 0 to 49.9 parts of at least one compound selected from that group consisting of vinyl monomers and vinylidene monomers and 0.10 to 10.0 parts by weight of at least one phenolic monomer according to claim 1, all parts being by weight per 100 parts by weight of total monomer.

6. The process according to claim 5 wherein $R^2$ is selected from the group consisting of hydrogen, alkyl radicals having 1 to 12 carbon atoms, phenyl radicals having 0 to 2 substituents selected from the group consisting of alkyl and alkoxy radicals said phenyl radicals having from 6 to 12 carbon atoms, phenyl radicals having 0 to 2 substituents selected from the group consisting of alkyl and alkoxy radicals, said phenyl radicals $R^3$ is selected from the group consisting of hydrogen, alkyl radicals having from 1 to 4 carbon atoms, having from 6 to 12 carbon atoms, $R^4$ is selected from the group consisting of hydrogen and methyl, $x$ is 0 or 1, $y$ is 0 to 3, $x$ plus $y$ is 0 to 4, $R^5$ is selected from the group consisting of hydrogen, methyl, a carboxymethyl radical and carbalkoxymethyl radicals having the following structural formula:

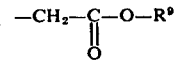

wherein $R^9$ is an alkyl radical having from 1 to 4 carbon atoms and $R^6$ is selected from the group consisting of hydrogen, carboxyl radical, phenyl and carbalkoxy radicals having the following structural formula:

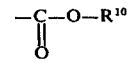

wherein $R^{10}$ is an alkyl radical having from 1 to 4 carbon atoms and $R^7$ and $R^8$ are selected from the group consisting of hydrogen and methyl.

7. The process according to claim 6 wherein $R^2$, $R^3$ and $R^4$ are selected from the group consisting of hydrogen and methyl, $R^9$ and $R^{10}$ are selected from the group consisting of ethyl and methyl radicals, A is selected from the group consisting of

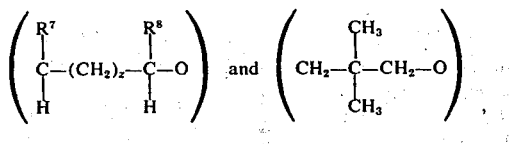

$z$ is 0 and $n$ is 1.

8. The process according to claim 7 wherein R and $R^1$ are tertiary butyl radicals.

9. The process according to claim 1 wherein the emulsion free radical polymerization system contains an initiator system comprised of at least one initiator selected from the group consisting of aralkyl peroxides, aliphatic peroxides, aromatic acyl peroxides, perester peroxides, aralkyl hydroperoxides, aliphatic hydroperoxides, persulfate initiators, perborate initiators and perphosphate initiators.

10. The process according to claim 1 wherein the emulsion free radical polymerization system contains an initiator system comprised of a reduction/oxidation initiator system.

11. The process according to claim 3 wherein the phenolic monomer is 2-(3,5-di-tert-butyl-4-hydroxybenzyloxy) ethyl methacrylate.

12. A polymer containing segmeric units, at least a portion of said units being comprised of at least one of the age resistant segmeric entities having the following structural formula:

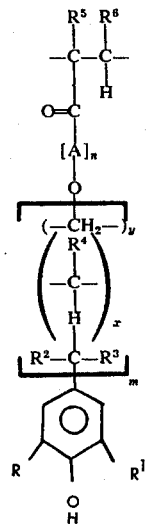

wherein R and $R^1$ are tertiary alkyl radicals having from 4 to 8 carbon atoms, wherein $R^2$ and $R^3$ are selected from the group consisting of hydrogen, alkyl radicals having from 1 to 12 carbon atoms, cycloalkyl radicals having from 5 to 12 carbon atoms, aralkyl radicals having from 7 to 13 carbon atoms and aryl radicals having from 6 to 12 carbon atoms, wherein $R^4$ is selected from the group consisting of alkyl radicals having from 1 to 12 carbon atoms, cycloalkyl radicals having from 5 to 12 carbon atoms and aralkyl radicals having from 7 to 13 carbon atoms, wherein $R^5$ is selected from the group consisting of hydrogen; alkyl radicals having from 1 to 4 carbon atoms, carboxymethyl radical and carbalkoxymethyl radicals and wherein $R^6$ is selected from the group consisting of hydrogen, alkyl radicals having from 1 to 4 carbon atoms, phenyl and substituted phenyl radicals having located in the para position a radical selected from the group consisting of alkyl radicals having 1 to 4 carbon atoms and alkoxy radicals having 1 or 2 carbon atoms, carboxyl radical and carbalkoxy radicals, wherein $x$ is an integer from 0 to 4, $y$ is an integer from 0 to 11-x, wherein $m$ is 0 or 1, $n$ is an integer from 1 to 3, wherein A is selected from the group consisting of

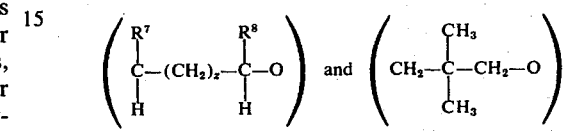

wherein $R^7$ and $R^8$ are selected from the group consisting of hydrogen, alkyl radicals having from 1 to 4 carbon atoms and aryl radicals having from 6 to 12 carbon atoms, wherein $z$ is an integer from 0 to 10, and wherein the polymer contains at least 40 parts by weight of the segmeric form of a diene monomer per 100 parts by weight of the polymer.

13. The polymer according to claim 12 wherein the age resistant segmeric entity comprises 0.10 part to 10.0 parts by weight per 100 parts by weight of the polymer.

14. The polymer according to claim 12 wherein the segmeric form of the diene monomer is present at a level of at least 50 parts by weight per 100 parts by weight of the polymer and wherein the diene monomer is a conjugated 1,3-diene monomer.

15. The polymer according to claim 14 wherein the polymer is a solid.

16. The polymer according to claim 15 wherein the polymer contains from 0.10 part to 10.0 parts by weight per 100 parts by weight of polymer of the age resistant segmeric unit and correspondingly 90 parts to 99.9 parts by weight of at least one segmeric form of at least one comonomer selected from the group consisting of conjugated 1,3-diene monomers, vinyl monomers and vinylidene monomers.

17. The polymer according to claim 16 wherein the polymer contains at least 50 percent by weight of at least one segmeric form of 1,3-butadiene.

18. The polymer according to claim 12 wherein the polymer contains 50 to 99.9 parts by weight of the segmeric form of at least one diene monomer, 0 to 49.9 parts by weight of at least one compound selected from the group consisting of vinyl monomers and vinylidene monomers and 0.10 to 5.0 parts by weight of at least one monomeric age resister, all parts being by weight per 100 parts by weight of polymer.

19. The polymer according to claim 15 wherein the polymer possesses a number average molecular weight of from 60,000 to 500,000.

20. The polymer according to claim 15 wherein the polymer possesses a number average molecular weight of at least 60,000 and has a macro gel content of less than 50 percent.

21. The polymer according to claim 16 wherein $R^2$ is selected from the group consisting of hydrogen, alkyl radicals having 1 to 12 carbon atoms, phenyl radicals having 0 to 2 substituents selected from the group consisting of alkyl and alkoxy radicals said phenyl radicals having from 6 to 12 carbon atoms, $R^3$ is selected from the group consisting of hydrogen, alkyl radicals having from 1 to 4 carbon atoms, phenyl radicals having 0 to 2 substituents selected from the group consisting of alkyl and alkoxy radicals said phenyl radicals having from 6 to 12 carbon atoms, $R^4$ is selected from the group consisting of hydrogen and methyl, $x$ is 0 or 1, $y$ is 0 to 3, $x$ plus $y$ is 0 to 4, $R^5$ is selected from the group consisting of hydrogen, methyl, a carboxymethyl radical and carbalkoxymethyl radicals having the following structural formula:

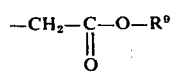

wherein $R^9$ is an alkyl radical having from 1 to 4 carbon atoms and $R^6$ is selected from the group consisting of hydrogen, carboxyl radical, phenyl and carbalkoxy radicals having the following structural formula:

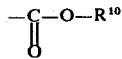

wherein $R^{10}$ is an alkyl radical having from 1 to 4 carbon atoms and $R^7$ and $R^8$ are selected from the group consisting of hydrogen and methyl.

22. The polymer according to claim 21 wherein $R^2$, $R^3$ and $R^4$ are selected from the group consisting of hydrogen and methyl, $R^9$ and $R^{10}$ are selected from the group consisting of ethyl and methyl radicals, A is selected from the group consisting of

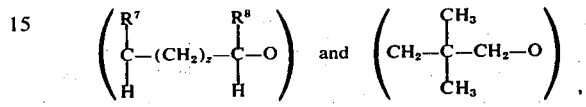

$z$ is 0 and $n$ is 1.

23. The polymer according to claim 22 wherein R and $R^1$ are tertiary butyl radicals.

* * * * *

UNITED STATES PATENT AND TRADEMARK OFFICE
CERTIFICATE OF CORRECTION

PATENT NO. : 3,962,187
DATED : June 8, 1976
INVENTOR(S) : Richard H. Kline

It is certified that error appears in the above-identified patent and that said Letters Patent are hereby corrected as shown below:

Column 5, Line 5, "hexano" should be --hexane--.

Column 10, Line 21, "process" should be --possess--.

Signed and Sealed this

Seventeenth Day of October 1978

[SEAL]

Attest:

RUTH C. MASON
Attesting Officer

DONALD W. BANNER
Commissioner of Patents and Trademarks